(12) United States Patent
Kumar et al.

(10) Patent No.: US 11,392,411 B2
(45) Date of Patent: Jul. 19, 2022

(54) BACKGROUND JOB SCHEDULING RESTRICTIONS

(71) Applicant: SAP SE, Walldorf (DE)

(72) Inventors: Mukesh Kumar, Bangalore (IN); Srinivasa Raghavan V, Chennai (IN); Sunil Mohan Bhandarkar, Bangalore (IN); Anirudh Prasad, Perinthalmanna (IN); Namrata, Mazarrarpur (IN)

(73) Assignee: SAP SE, Walldorf (DE)

( * ) Notice: Subject to any disclaimer, the term of this patent is extended or adjusted under 35 U.S.C. 154(b) by 196 days.

(21) Appl. No.: 16/678,859

(22) Filed: Nov. 8, 2019

(65) Prior Publication Data

US 2021/0141668 A1 May 13, 2021

(51) Int. Cl.
| | |
|---|---|
| *G06F 9/48* | (2006.01) |
| *G06F 9/451* | (2018.01) |
| *G06Q 10/06* | (2012.01) |
| *G06F 3/0484* | (2022.01) |
| *G06F 9/50* | (2006.01) |
| *G06N 20/00* | (2019.01) |
| *G06F 11/34* | (2006.01) |
| *G06F 11/30* | (2006.01) |

(52) U.S. Cl.
CPC .......... *G06F 9/4887* (2013.01); *G06F 3/0484* (2013.01); *G06F 9/451* (2018.02); *G06F 9/505* (2013.01); *G06F 9/5038* (2013.01); *G06F 9/5083* (2013.01); *G06N 20/00* (2019.01); *G06Q 10/06312* (2013.01); *G06F 9/5072* (2013.01); *G06F 11/3003* (2013.01); *G06F 11/3433* (2013.01)

(58) Field of Classification Search
None
See application file for complete search history.

(56) References Cited

U.S. PATENT DOCUMENTS

| | | | |
|---|---|---|---|
| 6,834,386 B1 | 12/2004 | Douceur et al. | |
| 8,627,321 B2 | 1/2014 | Teichmann et al. | |
| 10,146,824 B2 | 12/2018 | Friedmann et al. | |
| 2005/0108716 A1* | 5/2005 | Douceur | G06F 9/4881 718/100 |
| 2007/0156273 A1 | 7/2007 | von Helmolt et al. | |

(Continued)

FOREIGN PATENT DOCUMENTS

| | | |
|---|---|---|
| CN | 107729213 A | 2/2018 |
| CN | 109783212 A | 5/2019 |
| WO | WO-2017019826 A1 | 2/2017 |

*Primary Examiner* — Abu Zar Ghaffari
(74) *Attorney, Agent, or Firm* — Mintz Levin Cohn Ferris Glovsky and Popeo, P.C.

(57) ABSTRACT

In one aspect, there is provided a system including at least one data processor and at least one memory. The at least one memory may store instructions that cause operations when executed by the at least one data processor. The operations may include retrieving a schedule for a plurality of processes, the plurality of processes scheduled for multiple executions over a time period. The operations may further include generating a user interface configured to receive user input for scheduling a process of the plurality of processes, the user interface comprising one or more fields for scheduling the multiple executions. The operations may further restricting, by the processor, a quantity of scheduled executions for a process of the plurality of processes.

12 Claims, 6 Drawing Sheets

(56) References Cited

U.S. PATENT DOCUMENTS

| | | | | |
|---|---|---|---|---|
| 2009/0132754 | A1* | 5/2009 | Riska | G06F 3/0611 |
| | | | | 711/103 |
| 2014/0237476 | A1* | 8/2014 | Steffen | G06F 9/4843 |
| | | | | 718/103 |
| 2014/0366031 | A1* | 12/2014 | Jiang | G06F 9/4843 |
| | | | | 718/102 |
| 2015/0379429 | A1* | 12/2015 | Lee | G09B 5/00 |
| | | | | 706/11 |
| 2015/0379430 | A1* | 12/2015 | Dirac | G06N 20/00 |
| | | | | 706/12 |
| 2016/0078361 | A1* | 3/2016 | Brueckner | H04L 67/10 |
| | | | | 706/12 |
| 2018/0157535 | A1* | 6/2018 | Dushok | G06F 11/3433 |
| 2019/0138247 | A1* | 5/2019 | Gupta | G06N 20/20 |
| 2020/0026571 | A1* | 1/2020 | Bahramshahry | G06F 9/505 |
| 2020/0034073 | A1* | 1/2020 | Saha | G06F 3/067 |
| 2020/0104801 | A1* | 4/2020 | Kwon | G06Q 10/063116 |
| 2020/0379755 | A1* | 12/2020 | Boada | G06F 16/93 |

* cited by examiner

BACKGROUND JOB SCHEDULING RESTRICTIONS

TECHNICAL FIELD

The subject matter described herein relates generally to restricting scheduling of background processes in a cloud network.

BACKGROUND

An enterprise resource planning (ERP) system may include an issue tracking system configured to generate a ticket in response to an error reported via one or more telephone calls, emails, short messaging service (SMS) messages, social media posts, web chats, and/or the like. The ERP system may further include pre-built processes for everything from finance and sales to product management and purchasing on a single, unified solution. The ERP system may further include a testing environment and a production environment for executing processes. The testing environment may allow a customer to test processes to ensure compliance, efficiency, security, or the like before implementing the ERP system on production data.

SUMMARY

Systems, methods, and articles of manufacture, including computer program products, are provided for a restricting scheduling of background processes in a cloud network. In one aspect, there is provided a system including at least one data processor and at least one memory. The at least one memory may store instructions that cause operations when executed by the at least one data processor. The operations may include retrieving a schedule for a plurality of processes, the plurality of processes scheduled for multiple executions over a time period. The operations may further include generating a user interface configured to receive user input for scheduling a process of the plurality of processes, the user interface comprising one or more fields for scheduling the multiple executions. The operations may further restricting, by the processor, a quantity of scheduled executions for a process of the plurality of processes.

In some variations, one or more features disclosed herein including the following features can optionally be included in any feasible combination. Restricting the quantity of scheduled executions may include restricting a time period end date for running the process. Restricting the time period end date may include populating, based on a frequency of the process, an end date on a user interface. The operations may further include monitoring, by the processor, a workload of the system, wherein restricting the quantity of scheduled executions is based on the workload. Restricting the quantity of scheduled executions may include restricting a quantity of scheduled executions for the process based on a quantity of scheduled executions for the plurality of processes. Retrieving the schedule may include receiving the schedule from an imported production environment. Restricting the time period end date may include enforcing, based on a frequency of the process, a maximum allowable end date. Retrieving the schedule may include receiving the schedule from programmed code. Monitoring the workload may include retrieving a total quantity of background processes running on the system. Monitoring the workload may include monitoring a throughput, bandwidth, and processing speed of the processor, wherein the restricting is based on the monitored throughput, bandwidth, and/or processing speed.

In another aspect, there is provided a computer program product that includes a non-transitory computer readable storage medium. The non-transitory computer-readable storage medium may include program code that causes operations when executed by at least one data processor. The operations may include retrieving, by a processor, a schedule for a plurality of processes, the plurality of processes scheduled for multiple executions over a time period. The operations may further include restricting, by the processor, a quantity of scheduled executions for a process of the plurality of processes.

Implementations of the current subject matter can include methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to a machine learning data processing pipeline, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

A data processing pipeline may include a series of operations for collecting and/or manipulating data including, for example, exceptionally voluminous and/or complex data sets known as "big data." The data processing pipeline may be represented graphically as a plurality of operator nodes interconnected by one or more directed edges. Each operator node may correspond to a data processing operation performed on data traversing through the operator node. ERP systems may be configured to host and process a large amount of data from a plurality of customers. ERP systems typically consists of multiple enterprise software modules that may be individually purchased, based on what best meets the specific needs and technical capabilities of the customer. Each ERP module may be focused on one area of processes for customer, such as product development or marketing.

Many ERP processes may be run in the background for customer (e.g., outside normal business executed processes). For example, maintenance check processes may be running in the background as employees of a company or customer are working in their daily tasks. Given the potential for a large number of customers, a large number of background processes may consume memory and processing resources that may slow down the system for an end-user. In some implementations, ERP systems may be configured to deliver high end to end performance for an end-user and achieve a low total cost of ownership (TCO) with respect to processes run on the ERP system. In some aspects, in order to achieve high performance with low TCO, the system may restrict a quantity of processes running in the background to ensure end performance is not affected and sufficient resources are available for customer processing needs.

Figure 1:
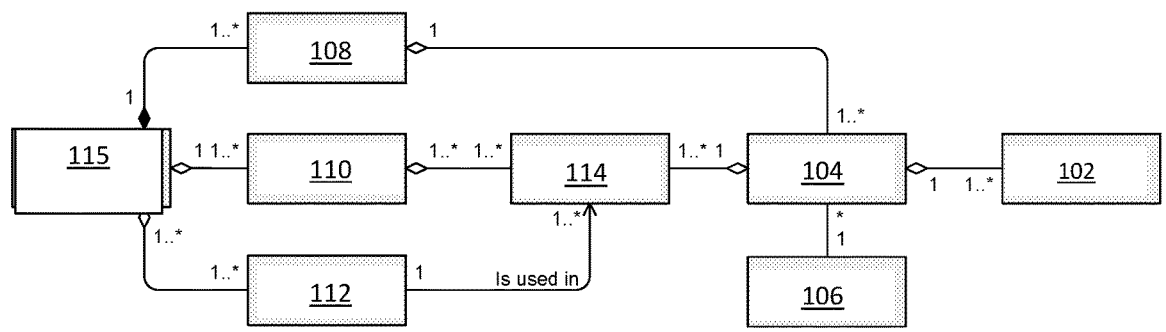
FIG. 1 depicts a system diagram illustrating a data processing system, in accordance with some example embodiments.

FIG. 1 depicts a system diagram illustrating a data processing system 100, in accordance with some example embodiments. Referring to FIG. 1, the data processing system 100 may retrieve a set of requirements 102. The requirements 102 may include system requirements, process requirements, application requirements, or the like. As shown in FIG. 1, the requirements 102 may be inputted for a (sub)area backlog item 104. The backlog item 104 may include a set of deliverables that may be implemented as part of a project or product development. A development sub area 106 may provide inputs for developing the backlog item 104. As further shown in FIG. 1, the development of the backlog item 104 may be included into a software increment module 108. In some aspects, a solution blueprint document 115 may collect development (e.g., processes, files, code, or the like) of the software increment module 108. As further shown, a process step 114 may be developed for the backlog item 104. The ERP system may define a user role 112 for performing the process step 114. In some aspects, a scenario variant 110 may be developed for the process step 114. The solution blueprint document 115 may further collect any or all information created in the development of the backlog item 104 (e.g., scenario variant 110, user role 112, process step 114, or the like).

In some implementations, the solution blueprint document 115 may identify background processes that may be negatively affecting performance of the ERP system 100. A background process is a process of a device that runs in the background and without user intervention. These background tasks can be used for processes that perform actions where a user intervention is not required. For example, a background task can be used for logging, system monitoring, device maintenance, software updates, media and/or application downloads, or other actions that do not require user intervention.

Because a background task does not require user intervention, the device can run this task on demand or can schedule to perform the background task at some future time. One way to perform the task in the future is to schedule this task is to have the task performed at a scheduled fixed time in the future. This can be can be used for a background task that is to be performed once or a recurring task that is periodically performed on a fixed time schedule.

In an enterprise resource planning (ERP) software application, background processes may consume a large portion of the processing resources of a computing system (e.g., cloud network). Recurring background processes may be scheduled indefinitely and frequently and may consume a disproportionate share of the computing resources and/or memory consumption. In some aspects, these recurring background processes may be created in a test environment and moved to a production environment, or vice versa, while maintaining the same drain on processing resources. It may be beneficial to restrict such recurring background processes to limit the amount and/or time these processes are run.

Recurring background processes may be scheduled in a variety of ways for a software application. In some aspects, the background processes may be scheduled via a user interface which allows a user to select when and how often a background process may be run. Additionally, background processes may be programmatically scheduled. For example, a process may be coded to run upon the occurrence of a given event or at a given schedule (e.g., daily, weekly, etc.). Further, recurring background processes may be imported from a test environment, a production environment, or otherwise imported into the computing network.

Restricting schedules of recurring background processes may be implemented at different levels and/or in different ways. In some aspects, restricting a schedule of a recurring background process may be time bound. For example, the recurring background process may not be able to execute recurrently beyond 10 Days or 10 executions. In some implementations, restricting a schedule of a recurring background process may include restricting a number of per instance recurrent scheduling. For example, restricting a quantity of scheduled background processes allowed per instance (e.g., maximum of five scheduled executions). Restricting a schedule of recurring background processes may also include restricting a number of recurrent scheduling across all instances of the given background process. For example, restricting the number of scheduled processes across all instances of the background process (e.g. maximum of 30 active scheduled background processes).

Restriction of recurrent background processes may be implemented at different times. For example, the restriction may be enforced at the time of a recurring schedule is created for a background process (e.g., scheduling from a user interface, program scheduling, or imported scheduling).

For the user interface, as the user enters a desired recurring schedule for a background process, the user interface may calculate whether a threshold number of executions or a threshold time period has been satisfied and may update one or more fields of the user interface to restrict a parameter for scheduling the recurring background process (e.g., restrict a frequency of execution, an end date for the schedule, a quantity of executions, or the like).

Figure 2:
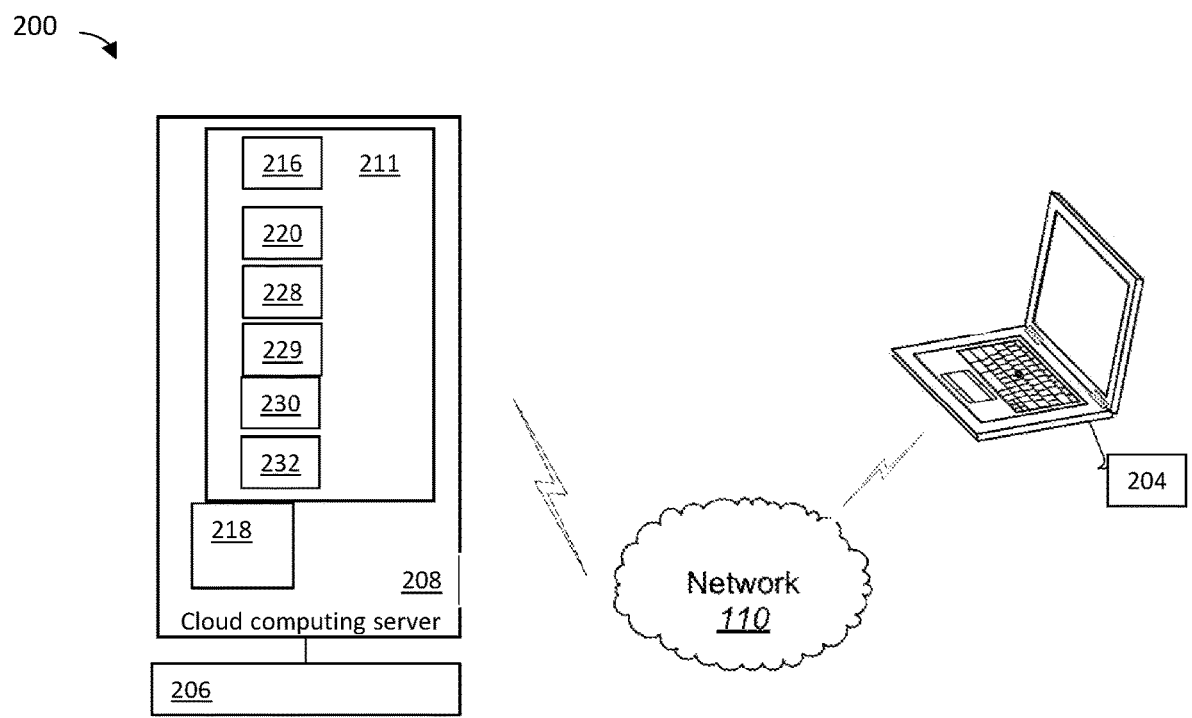
FIG. 2 is a block diagram of an example system for performing cloud process scheduling functions using a scheduler in a cloud computing environment.

FIG. 2 is an example block diagram of a system 200 for performing background job scheduling in a cloud computing environment. The system 200 includes a source 204 interacting with a cloud computing server 208 through the network 110. The source 204 may be one or more computing devices (e.g., client computing devices) providing any number of user interfaces associated with software executing at the client device. The source 204 may be any type of one or more computing devices including, but not limited to, a laptop, a desktop, a server (e.g., a web server and/or an application server), a smartphone, a tablet, or any combinations thereof.

The source 204 includes an application, which is a consuming software application that enables the source 204 to schedule processes as part of a data record that is stored in a database 218. As discussed herein and in more detail below, the schedule of processes may be sent over network 110 as input 122 to the cloud computing server 208, which hosts and performs one or more job scheduling functions 211 on the received inputs.

The source 204 may represent a computer coupled to the Internet, such as a web server that receives data input from other computing devices. For example, the source 204 as a web server or application server may receive input from another computing device as a user enters data into a form on a web site. The data input into the source 204 may then be communicated by the source 204 as part of a data record to the cloud computing server 208, where the cloud computing server 208 can perform one or more of the cloud scheduling functions 211 on the received inputs using determined restrictions. While this example describes sending a single process schedule from the source 204 to the cloud computing server 208, the source 204 may send multiple process schedules as part of a batch process to the cloud computing server 208 for performing one or more data job scheduling on the received processes.

The cloud computing server 208 (or simply server 208) may host the cloud scheduling functions 211. In some implementations, the server 208 may represent a web server such as a Hana Cloud Platform (HCP) from SAP SE and include a HANA database 218, although other platforms and servers may be used as well. HANA is a column-based in-memory database management system. The HANA database 218 may provide a platform for the data quality functions 211 in cooperation with enterprise software application 206.

The cloud scheduling functions 211 include monitoring 216, date restriction 220, process quantity restriction 228, process canceling 229, user interface populating 230 and process validation 232. One or more of these cloud scheduling functions may be performed on the process schedules received from the source 204, whether received as a single data record or multiple data records. In particular, the cloud scheduling 211 may be configured to analyze, modify, and cancel recurrent background processes to ensure a threshold system performance is provided. In particular, the cloud scheduling functions 211 may restrict an end date for recurrent background processes to prevent an indefinite overload of background processes on the system. In addition, the cloud scheduling functions 211 may restrict a quantity of background processes to reduce an amount of processing resources used in the system, and may also monitor a system workload and restrict background processes based on the system workload satisfying a threshold.

The cloud scheduling functions 211 includes monitoring 216. Monitoring 216 may monitor computing resources on the cloud computing server 208. For example, the monitoring 216 may monitor the cloud computing server 208 workload, and if a threshold workload is satisfied, the monitoring 216 may signal to cancel at least a portion of scheduled recurrent background processes. In some aspects, the monitoring 216 may signal the process cancellation 229 two cancel the portion of scheduled recurrent background processes. Any quantity of recurrent background processes may be canceled. In some implementations, the process canceling 229 may cancel only the portion of scheduled recurrent background processes necessary to reduce the workload on the cloud computing server 208 below the threshold workload.

Figure 3:
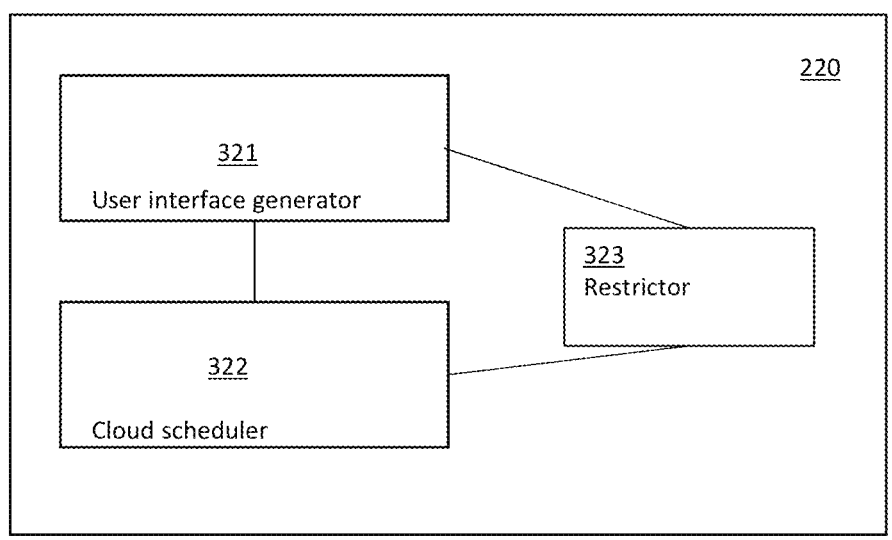
FIG. 3 is an example block diagram of the date restriction function from FIG. 2, in accordance with some example embodiments.

The cloud scheduling functions 211 further includes date restriction 220 and process quantity restriction 228. Date restriction 220 and/or process quantity restriction 228 may impose restrictions through a user interface. FIG. 3 is an example block diagram of the date restriction function 220 from FIG. 2.

For example, the user interface (e.g., user interface 400) may include one or more fields for entering a frequency for running a process and one or more fields for entering an end date/time for the process. In some aspects, if no end date/time is selected, the process may run indefinitely and may consume processing resources indefinitely. The date restriction 220 may impose restrictions on the end date/time of a process. For example, the date restriction 220 may auto populate the one or more fields for entering an end date/time with a determined end date/time. The determined end date/time may be based on the frequency of the process (e.g., minutely, hourly, daily, weekly, etc.). The determined end date/time may also be based on the current system workload (e.g., a shorter end date when the system workload is close to a threshold). In some aspects, the user may select an alternate end date than the auto-populated selection but the user may be required to select a definite end date/time to prevent the process from running indefinitely.

The process quantity restriction 228 may impose restrictions on a number of times a process may run in a given time period or in general. For example, the process quantity restriction 228 may restrict which options may be selected in the user interface in order to restrict the quantity of times a process run (e.g., what frequency may be selected). For example, the process quantity restriction may restrict the user from selecting to run a process every minute or every hour but may allow the user to run a process every week or month. Additionally, the process quantity restriction 228 may restrict a total number of times a process may be run (e.g., a process may be run only five times).

The cloud computing server 208 may also include (or have access to) enterprise software application 206. The enterprise software application 206 represents computer software used to satisfy the needs of a business organization. Enterprise software application 206 generally includes a collection of computer programs (i.e., software applications and repositories) with common business applications, tools for modeling how an organization functions, and development tools for building applications unique to the organization. The enterprise software application 206 may be used in combination with server 208 to improve enterprise productivity and efficiency by providing data quality configuration generation and usage.

Services provided by the enterprise software application 206 may include computer tools such as data model configuration management and cloud process scheduling and management. Other services are possible including, online shopping and online payment processing, interactive product management, automated billing systems, security, enterprise content management, IT service management, customer relationship management, enterprise resource planning, business intelligence, project management, collaboration, human resource management, manufacturing, enterprise application integration, and enterprise forms automation.

The server 208 in system 200 may be communicatively coupled to source 204. Source 204 can access server 208 and any associated software applications. Source 204 can be connected (wired or wirelessly) to system 208, which can provide business data, user interfaces, and other data for use and display. In some implementations, the source 204 can execute one or more applications on the server 208 as a web application, for example.

At least some of the communications between the client 204 and servers 206 or 208 may be performed across or via network 110 (e.g., the Internet). In some implementations, system 200 may represent an example configuration of a system for establishing networks using networked applications built on a shared platform in a cloud computing environment. The source 204 and/or the server 208 may be configured with development technology and hosted and managed services and applications built on top of an underlying platform technology. In one non-limiting example, the term "platform technology" is understood as types of Java development platform, such as e.g., Enterprise JavaBeans® (EJB), J2EE Connector Architecture (JCA), Java Messaging Service (JMS), Java Naming and Directory Interface (JNDI), and Java Database Connectivity (JDBC). In an implementation of the present disclosure described herein, the term "platform technology" is understood as an Enterprise Resource Planning (ERP) technology or in-memory database such as High Performance Analytic Appliance (HANA) platform.

In some implementations, any number of content servers and one or more computer-readable storage devices can communicate with the source 204 and server 208 using network 110 to provide data content to client devices associated with system 100. In some implementations, the network 110 can be a public communications network (e.g., the Internet, cellular data network, dialup modems over a telephone network) or a private communications network (e.g., private LAN, leased lines). In some implementations, the source 204 and/or server 208 can communicate with the network 110 using one or more high-speed wired and/or wireless communications protocols (e.g., 802.11 variations, WiFi, Bluetooth, Transmission Control Protocol/Internet Protocol (TCP/IP), Ethernet, IEEE 802.3, etc.).

FIG. 3 is an example block diagram of the date restriction 220 function from FIG. 2, in accordance with some example embodiments. In this example, the date restriction 220 function includes a user interface generator 321, a cloud scheduler 322, and a process restrictor 323. The user interface generator 321 may generate a user interface (e.g., user interface 400) for scheduling a background process. The user interface may include one or more fields for scheduling a recurrent background process (e.g., a start date/time, a frequency of the recurrent background process, an end date/time, a quantity of process runs/executions, etc.). The cloud scheduler 322 may schedule and/or store one or more schedules for process runs/executions. For example, the cloud schedule 322 may store schedules for background process runs entered in the user interface generated by the user interface generator 321. The process restrictor 323 may restrict one or more features of a process. For example, the process restrictor 323 may restrict an end date for a recurrent background process scheduled in the user interface. This restriction may prevent a background process from running indefinitely. In some aspects, the process restrictor 323 may be configured to auto-populate at least one of the one or more fields of the user interface (e.g., the end date/time field 406). In some implementations the process restrictor 323 may enforce a restriction on the end date/time. For example, the process restrictor 323 may require that the user enter a valid end date/time before saving or moving to a next screen. If the user does not enter a valid end date/time, the process restrictor 323 may display an error message or other alert to notify the user that a valid end date/time is required for scheduling a process. In some aspects, the process restrictor 323 may base its restriction on a current system workload, a current number of recurrent background processes scheduled, or a quantity of scheduled background process runs entered in the user interface.

Figure 4:
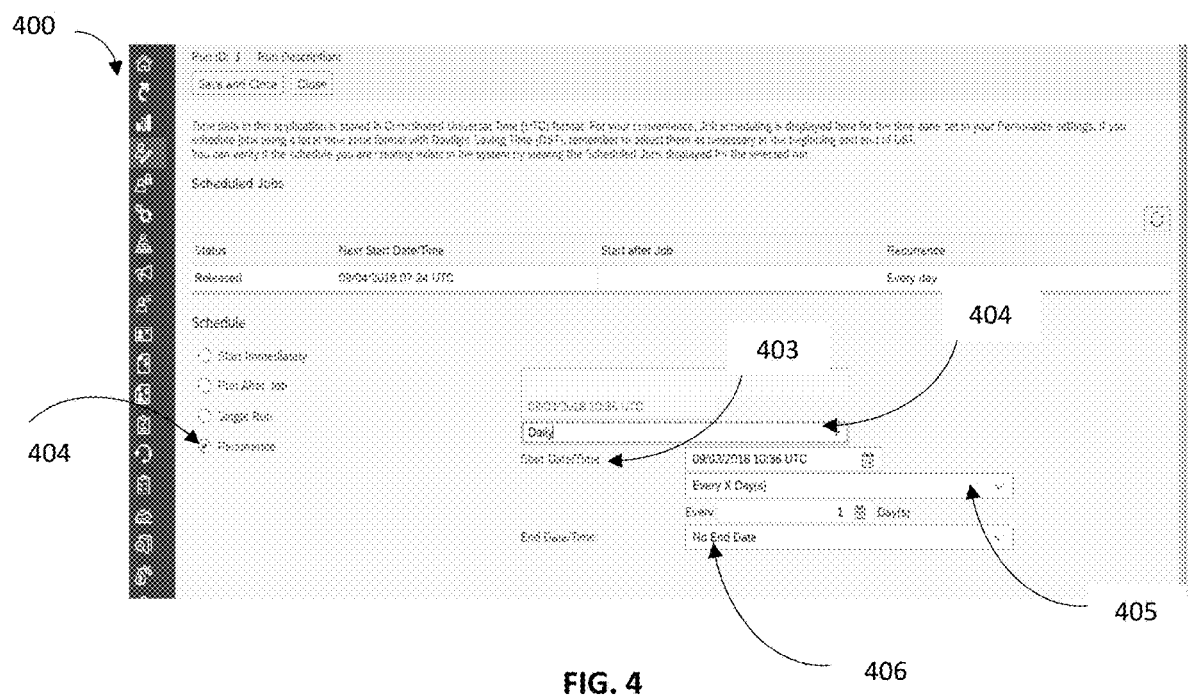
FIG. 4 shows an example user interface scheduling a background process, in accordance with some example embodiments.

FIG. 4 shows an example user interface 400 for scheduling a background process. As shown, upon selection of the recurrence button schedule 404, a user may select a frequency (e.g., minutely, hourly, daily, weekly, etc.) for the background process using menu 404. The user may also select an end date for the recurring background process using menu 406. The user may also select a start date/time for execution of the process and indicate a recurrence of the process (e.g., every X day(s)) using menu 405.

In some aspects, based on the frequency of the recurring background process, a maximum allowable end date may be enforced. For example, for daily recurring background processes the maximum allowable end date may be 30 days from a start date for the process. In some implementations, a maximum number of recurring background processes may be enforced across all background processes. The maximum number may be configured to be large enough to accommodate different features of the software application and still be small enough to ensure running background processes do not affect the performance of the software application. In some aspects, the user interface 400 may display a number of current active and scheduled recurring background processes so that a user is aware of the threshold. While certain buttons, menus, and options are depicted in FIG. 4 and described herein, other buttons, menus, and options are also possible.

In addition to restricting recurring background processes at creation, the restriction may also occur based on a workload, throughput, bandwidth processing speed, etc., or combination thereof, of the network. For example, if a recurrently scheduled background process runtime exceeds a threshold time or a foreground process execution time exceeds a threshold time, the background process or foreground process may be canceled. Alternatively, the system may monitor the system workload, and if a threshold workload is satisfied, the system may cancel at least a portion of the scheduled recurrent background processes. This approach may provide a safeguard and help ensure a threshold performance of the system if other background process restriction does not provide the threshold performance. In some aspects, critical or priority processes may be whitelisted or excluded from the portion of canceled recurrent background process for a specific customer or all customers.

Figure 5:
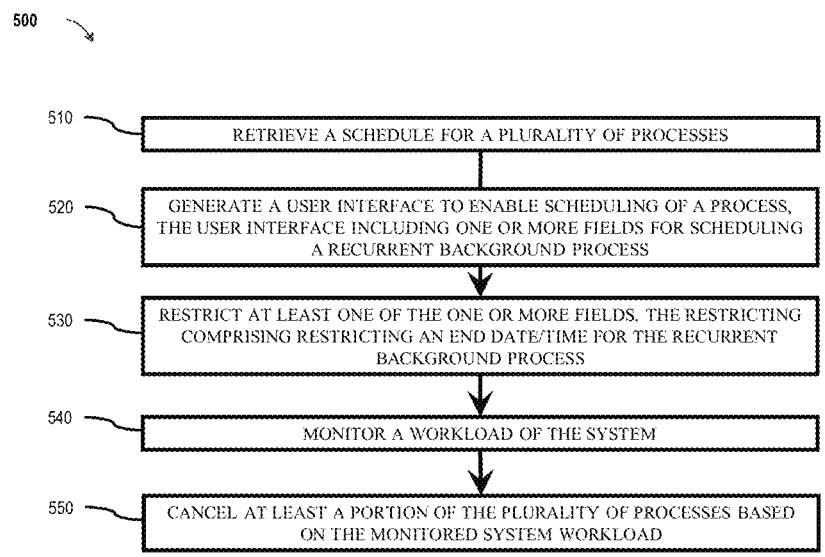
FIG. 5 depicts a flowchart illustrating a process for restricting a quantity of recurring background processes, in accordance with some example embodiments.

FIG. 5 depicts a flowchart illustrating a process 500 for restricting a quantity of recurring background processes, in accordance with some example implementations. Referring to FIGS. 1-4, 6, the process 500 may be performed by a computing apparatus such as, for example, the computing device 600, the date restriction function 220, the cloud scheduling functions 211 a server, and/or the like.

At operational block 510, the apparatus 600 or the cloud scheduling functions 211, for example, may retrieve a schedule for a plurality of processes. In some aspects, the plurality of processes may include recurrent background processes scheduled for multiple executions over a timeframe. For example, the recurrent background process may be scheduled to run hourly until a specified end date/time. If an end date/time is not specified, the recurrent background process may run hourly indefinitely.

At operational block 520, the apparatus 600, the cloud scheduling functions 211, or the user interface generator 321, for example, may generate a user interface configured to receive user input for scheduling a process of the plurality of processes. The user interface may include one or more fields for scheduling a recurrent background process. For example, the user interface may include the user interface 400 and fields 403, 404, 405, and 406 for scheduling the recurrent background process (e.g., a start date/time, a frequency, an end date/time, etc.).

At operational block 530, the apparatus 600, the cloud scheduling functions 211, or the restrictor 323, for example, may restrict an entry of at least one field of the one or more fields. In some aspects, the restricting the entry of at least one of the one or more fields may include restricting an end date/time for the recurrent background process. In some implementations, restricting the end date/time may include auto populating an end date/time entry in the at least one field. For example, the restrictor 323 may auto populate the end date/time field 406 with a specific end date/time so that the process does not run indefinitely. Additionally, the restrictor 323 may restrict possible valid entries for the field 406. For example, the restrictor 323 may enforce the restriction that valid entries may only be within two weeks (or other time period) of the start date/time for the process.

At operational block 540, the apparatus 600, the cloud scheduling functions 211, or the monitoring 216, for example, may monitor a workload of the system. In some aspects, monitoring the workload of the system may include monitoring a total quantity of recurrent background processes of the system, monitoring a process speed of the system, monitoring a quantity of processes currently running, or the like. For example, if the workload of the system exceeds a certain percentage (e.g., 60%), the monitoring 216 may signal one or more of the cloud scheduling functions 211. In some aspects, the monitoring 216 may implement a machine learning model configured to identify a subset of the recurrent background processes to restrict/cancel. The machine learning model may identify the subset based on a determination of whether the recurrent background process has previously been executed or has already been executed a threshold number of times. The identifying of the subset may also be based on a determination of whether past execution of the processes actually produced results or whether the past executions simply started and ended without processing data for that process type, or whether a majority of the past executions failed to fully execute for that particular process type.

At operational block 550, the apparatus 600, the cloud scheduling functions 211, or the process canceling 229, for example, may cancel at least a portion of the plurality of processes based on the monitored workload of the system. In some aspects, canceling the portion of the plurality of processes is in response to the monitored workload satisfying a threshold. For example, if the monitored workload exceeds the threshold (e.g., 60%), the process canceling 229 may cancel a quantity of processes sufficient to reduce the workload below the threshold. In some aspects, certain processes may be white listed so as to prevent cancellation of system critical process or cancellation of processes that would affect user experience.

Figure 6:
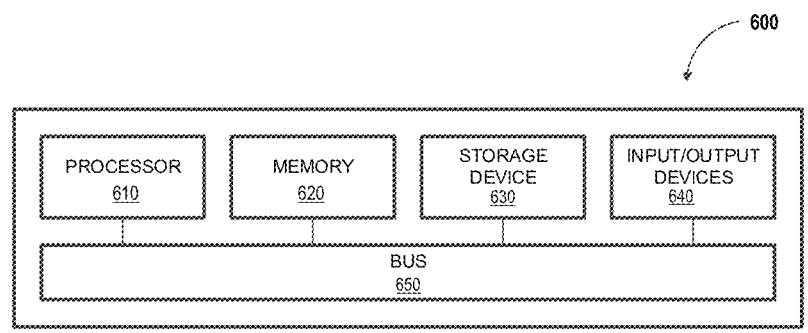
FIG. 6 is a block diagram illustrating a computing system, in accordance with some example embodiments.

FIG. 6 depicts a block diagram illustrating a computing system 600 consistent with implementations of the current subject matter. Referring to FIGS. 1-3, the computing system 300 can be used to implement the system 100 and/or 200, the date restriction function 220, the cloud scheduling functions 211, and/or any components therein and the process 500.

As shown in FIG. 3, the computing system 300 can include a processor 610, a memory 620, a storage device 630, and input/output devices 640. The processor 610, the memory 620, the storage device 630, and the input/output devices 640 can be interconnected via a system bus 650. The processor 610 is capable of processing instructions for execution within the computing system 600. Such executed instructions can implement one or more components of, for example, a cloud server. In some example embodiments, the processor 610 can be a single-threaded processor. Alternately, the processor 610 can be a multi-threaded processor. The processor 610 is capable of processing instructions stored in the memory 620 and/or on the storage device 630 to display graphical information for a user interface provided via the input/output device 640.

The memory 620 is a computer readable medium such as volatile or non-volatile that stores information within the computing system 600. The memory 620 can store data structures representing configuration object databases, for example. The storage device 630 is capable of providing persistent storage for the computing system 600. The storage device 630 can be a solid state drive, a floppy disk device, a hard disk device, an optical disk device, or a tape device, or other suitable persistent storage means. The input/output device 640 provides input/output operations for the computing system 600. In some example embodiments, the input/output device 640 includes a keyboard and/or pointing device. In various implementations, the input/output device 640 includes a display unit for displaying graphical user interfaces.

According to some example embodiments, the input/output device 640 can provide input/output operations for a network device. For example, the input/output device 640 can include Ethernet ports or other networking ports to communicate with one or more wired and/or wireless networks (e.g., a local area network (LAN), a wide area network (WAN), the Internet).

In some example embodiments, the computing system 600 can be used to execute various interactive computer software applications that can be used for organization, analysis and/or storage of data in various formats. Alternatively, the computing system 600 can be used to execute any type of software applications (e.g., ERP application). These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities (e.g., SAP Integrated Business Planning as an add-in for a spreadsheet and/or other type of program) or can be standalone computing products and/or functionalities. Upon activation within the applications, the functionalities can be used to generate the user interface provided via the input/output device 640. The user interface can be generated and presented to a user by the computing system 600 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random query memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A system, comprising:
   at least one data processor; and
   at least one memory storing instructions which, when executed by the at least one data processor, result in operations comprising:
   retrieving, by a cloud scheduler at a cloud server, a schedule for a plurality of processes, wherein the plurality of processes comprise at least one recurrent background process scheduled for multiple executions over a time period;
   generating, by the cloud scheduler at the cloud server, a user interface configured to receive user input for scheduling at least the at least one recurrent background process of the plurality of processes, wherein the user interface comprises one or more fields for scheduling the multiple executions, wherein the one or more fields comprise a recurrence user interface element which when selected enables a first selection of a frequency for the at least one recurrent background process, a second selection of a start date for the at least one recurrent background process, and a third selection indicative of whether there is an end date for the at least one recurrent background process;

restricting, by the cloud scheduler at the cloud server, a quantity of scheduled executions for the at least one recurrent background process of the plurality of processes, wherein the restricting further comprises restricting the one or more fields by at least providing the end date in response to the third selection indicating that the end date was not selected;

monitoring, by the cloud scheduler at the cloud server, a workload of the system to determine the workload exceeds a threshold workload, wherein the restricting of the quantity of scheduled executions for the at least one recurrent background process is further based on the monitored workload; and canceling, by the cloud scheduler at the cloud server, the at least one recurrent background process based on the workload exceeding the threshold workload, wherein a machine learning model identifies the at least one recurrent background processes for cancelation based on whether the at least one recurrent background process has previously executed and/or has executed a threshold number of times.

2. The system of claim 1, wherein restricting the quantity of scheduled executions comprises restricting the quantity of scheduled executions for the at least one recurrent background process across all instances.

3. The system of claim 1, wherein retrieving the schedule comprises importing the schedule from a production environment.

4. The system of claim 1, wherein restricting the time period end date comprises enforcing, based on a frequency of the at least one recurrent background process, a maximum allowable end date.

5. The system of claim 1, wherein retrieving the schedule comprises importing the schedule from programmed code.

6. The system of claim 1, wherein restricting the quantity of scheduled executions comprises restricting the quantity of scheduled executions for the at least one recurrent background process via programmed code.

7. The system of claim 1, wherein monitoring the workload comprises retrieving a total quantity of background processes running on the system.

8. The system of claim 1, wherein monitoring the workload comprises monitoring a throughput, bandwidth, and processing speed, wherein the restricting is based on the monitored throughput, bandwidth, and/or processing speed.

9. The system of claim 1, wherein identifying the subset of scheduled executions is further based on whether the at least one recurrent background process previously failed to fully execute.

10. A computer implemented method, comprising:
retrieving, by a processor, a schedule for a plurality of processes, wherein the plurality of processes comprise at least one recurrent background process scheduled for multiple executions over a time period, wherein the processor comprises a cloud scheduler at a cloud server;

generating, by the processor, a user interface configured to receive user input for scheduling at least the at least one recurrent background process of the plurality of processes, wherein the user interface comprises one or more fields for scheduling the multiple executions, wherein the one or more fields comprise a recurrence user interface element which when selected enables a first selection of a frequency for the at least one recurrent background process, a second selection of a start date for the at least one recurrent background process, and a third selection indicative of whether there is an end date for the at least one recurrent background process;

restricting, by the processor, a quantity of scheduled executions for the at least one recurrent background process of the plurality of processes, wherein the restricting further comprises restricting the one or more fields by at least providing the end date in response to the third selection indicating that the end date was not selected;

monitoring, by the processor, a workload of the system to determine the workload exceeds a threshold workload, wherein the restricting of the quantity of scheduled executions for the at least one recurrent background process is further based on the monitored workload; and canceling, by the processor, the at least one recurrent background process based on the workload exceeding the threshold workload, wherein a machine learning model identifies the at least one recurrent background processes for cancelation based on whether the at least one recurrent background process has previously executed and/or has executed a threshold number of times.

11. The method of claim 10, wherein monitoring the workload comprises monitoring a throughput, bandwidth, and processing speed of the processor, wherein the restricting is based on the monitored throughput, bandwidth, and/or processing speed.

12. A non-transitory computer readable medium storing instructions, which when executed by at least one data processor, result in operations comprising:
retrieving, by a cloud scheduler at a cloud server, a schedule for a plurality of processes, wherein the plurality of processes comprise at least one recurrent background process scheduled for multiple executions over a time period;

generating, by the cloud scheduler at the cloud server, a user interface configured to receive user input for scheduling at least the at least one recurrent background process of the plurality of processes, wherein the user interface comprises one or more fields for scheduling the multiple executions, wherein the one or more fields comprise a recurrence user interface element which when selected enables a first selection of a frequency for the at least one recurrent background process, a second selection of a start date for the at least one recurrent background process, and a third selection indicative of whether there is an end date for the at least one recurrent background process;

restricting, by the cloud scheduler at the cloud server, a quantity of scheduled executions for the at least one recurrent background process of the plurality of processes, wherein the restricting further comprises restricting the one or more fields by at least providing the end date in response to the third selection indicating that the end date was not selected;

monitoring, by the cloud scheduler at the cloud server, a workload of the system to determine the workload exceeds a threshold workload, wherein the restricting of the quantity of scheduled executions for the at least one recurrent background process is further based on the monitored workload; and canceling, by the cloud scheduler at the cloud server, the at least one recurrent background process based on the workload exceeding the threshold workload, wherein a machine learning model identifies the at least one recurrent background processes for cancelation based on whether the at least one recurrent background process has previously executed and/or has executed a threshold number of times.

\* \* \* \* \*